US007406076B2

(12) United States Patent
Katoh

(10) Patent No.: US 7,406,076 B2
(45) Date of Patent: Jul. 29, 2008

(54) TRANSMISSION SYSTEM AND METHOD THEREOF

(75) Inventor: Noriyasu Katoh, Shinagawa-ku (JP)

(73) Assignee: Allied Telesis K.K. (JP)

(*) Notice: Subject to any disclaimer, the term of this patent is extended or adjusted under 35 U.S.C. 154(b) by 1004 days.

(21) Appl. No.: 10/370,456

(22) Filed: Feb. 24, 2003

(65) Prior Publication Data

US 2004/0028058 A1    Feb. 12, 2004

(30) Foreign Application Priority Data

Aug. 7, 2002  (WO) ................. PCT/JP02/08064

(51) Int. Cl.
*H04L 12/56* (2006.01)
(52) U.S. Cl. ...................... 370/390; 370/392
(58) Field of Classification Search ................ 370/390, 370/392, 393, 475
See application file for complete search history.

(56) References Cited

U.S. PATENT DOCUMENTS 6,937,574 B1 * 8/2005 Delaney et al. ............. 370/254

2003/0123453 A1 * 7/2003 Ooghe et al. ........... 370/395.53

FOREIGN PATENT DOCUMENTS

| EP | 1045553 A2 * | 10/2000 |
| JP | A 9-130421 | 5/1997 |
| JP | A 9-186715 | 7/1997 |
| JP | A 9-200246 | 7/1997 |
| JP | A 11-313073 | 11/1999 |
| JP | A 2000-13429 | 1/2000 |
| JP | A 2002-77213 | 3/2002 |

* cited by examiner

*Primary Examiner*—Melvin Marcelo
(74) *Attorney, Agent, or Firm*—Steven J. Hultquist; Intellectual Property/Technology Law

(57) ABSTRACT

The frame disassembly unit receives the MAC frame to insert/identify a destination address and tag. The information retrieval unit retrieves the VLAN information DB to discover the tag and port which correspond to the destination address. The type determination unit determines whether the MAC frame received is unicast, multicast or broadcast. The unicast transmission control unit controls the switching device so as to transmit the MAC frame to the communication node of the destination. The multicast transmission control unit controls the switching device so as to confine within a VLAN to transmit the MAC frame by multicast or broadcast.

10 Claims, 13 Drawing Sheets

FIG. 3

IEEE802. 3 MAC FRAME

| PREAMBLE | S F D | DISTINATION ADDRESS | TRANSMISSION SOURCE ADDRESS | LENGTH OF FRAME | LLC HEADER | LLC DATA | FCS |

FIG. 6

| TAG #1 | MAC ADDRESS/PORT OF NODE#1-1<br>MAC ADDRESS/PORT OF NODE#1-2<br>.<br>.<br>.<br>MAC ADDRESS/PORT OF NODE#1-m |
|---|---|
| TAG #2 | MAC ADDRESS/PORT OF NODE#2-1<br>MAC ADDRESS/PORT OF NODE#2-2<br>.<br>.<br>.<br>MAC ADDRESS/PORT OF NODE#2-n |

FIG. 11
(A)
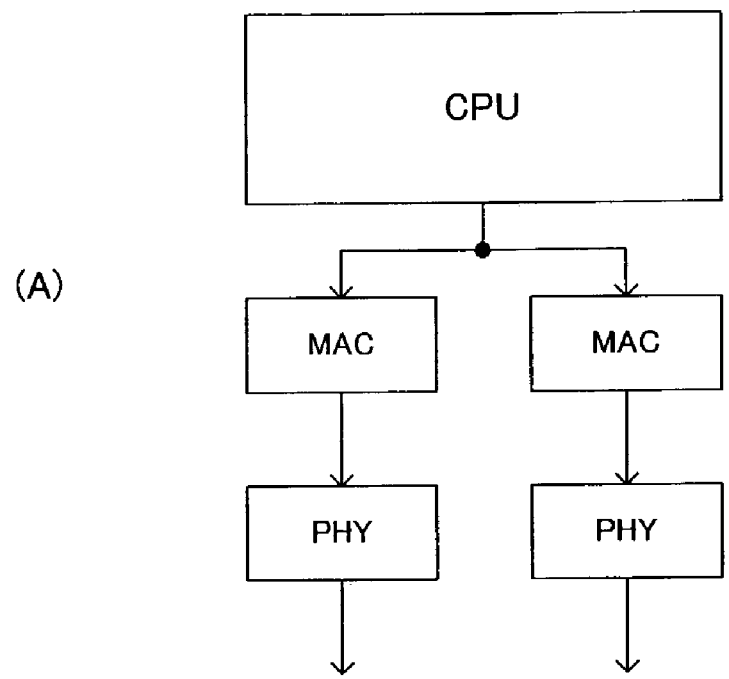
(B)
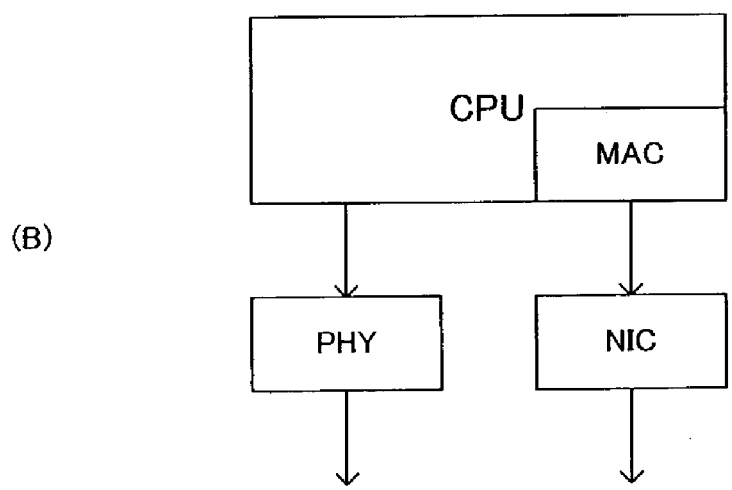

TRANSMISSION SYSTEM AND METHOD THEREOF

BACKGROUND OF INVENTION

1. Field of the Invention

The present invention relates to a data transmission system for transmitting data over a LAN or the like and a method thereof.

2. Description of the Related Art

There is generally used a VLAN (Virtual LAN) which utilizes one LAN (Local Area Network) as if it were a plurality of LANs.

In the VLAN, unicast transmission for transmitting certain data to one destination and multicast/broadcast transmission for transmitting the same data to a plurality of destinations are performed.

For example, a network management system and switching HUB unit in the VLAN have been disclosed in Japanese unexamined patent publication H11-313073 and Japanese unexamined patent publication 2000-13429 (references 1 and 2).

The method to perform transmission control by giving an identifier (VLAN-ID) to each of VLANs and adding the VLAN-ID to a MAC (Media Access Control) frame (IEEE802.3) as a tag (defined in IEEE802.3Q) is also referred to as TAG-VLAN.

A switching device referred to as switching HUB or the like is used for data transmission in the VLAN.

This switching device generally performs processes in a MAC layer belonging to a second layer (data link layer) of an OSI reference model.

That is, when receiving the transmission frame (MAC frame) of the multicast/broadcast, the switching device generally outputs the received transmission frame to all ports regardless of whether a node belonging to the same VLAN as a node at the transmission source is connected, or a node belonging to a different VLAN is connected.

As described above, control of the transmission frame, which has been sent beyond the VLAN (segment), is left to process in an IP layer of a TCP/IP protocol group corresponding to the third layer (network layer) of the OSI reference model.

If the transmission frame of multicast/broadcast can be confined within each of the VLANs to be transmitted by a process in the MAC layer, it goes without saying that it will be possible to restrain network traffic, and to reduce the load of the communication node and that it will also be advantageous in terms of security and the like.

BRIEF DESCRIPTIONS OF THE INVENTION

The present invention has been achieved in the above-described background, and aims to provide a transmission system capable of restraining the traffic of the LAN and reducing the load, and a method thereof.

Also, it is an object of the present invention to provide a transmission system that increases transmission speed and improves transmission efficiency by restraining the occurrence of multicast/broadcast in the VLAN, and a method thereof.

Transmission System

In order to achieve the above-described object, there is provided a transmission system according to the present invention, having: a transmission apparatus for transmitting target data subject to transmission between a plurality of nodes each having an address; and a transmission control apparatus for controlling transmission of target data between the nodes, the plurality of nodes are divided into a plurality of groups, each group including one or more of the nodes, the transmission control apparatus having: determination means for determining whether the target data transmitted by each of the nodes being first target data to be transmitted to any one destination of the plurality of nodes or second target data to be transmitted to any one or more destinations of the plurality of nodes; first control means for controlling so that the transmitted first target data being transferred to the node designated as the destination when the transmitted target data being determined as the first target data; and second control means for controlling so that the transmitted second target data being transferred to the node/nodes belonging to the same group as the node having transmitted the second target data within the nodes designated as the destination when the transmitted target data being determined as the second target data.

Preferably, the transmission apparatus being a switching apparatus, the switching apparatus, having: a plurality of ports to which each of the plurality of nodes being connected respectively, and a switch for transferring the target data between the plurality of ports under control of transmission of the target data.

Preferably, the transmission apparatus and the transmission control apparatus are integrated.

Preferably, an identifier is attached to each of the plurality of groups, each of the nodes attaches the identifier of the group to which each belonging to the target data to transmit the target data with the identifier, and the second control means controls so as to transfer the transmitted second target data to the node/nodes belonging to the group which indicated by the identifier attached to the second target data.

Preferably, the target data is transmitted in a format of a MAC (Media Access Control) frame defined in the IEEE802.3Q, a node to be included in each of the plurality of groups owns the transmission apparatus jointly to constitute each of a plurality of VLANs (Virtual Local Area Networks), and an identifier attached to each of the plurality of groups is a VLAN-ID (Identifier) of each of the plurality of VLANS, and is attached to the MAC frame as a tag.

Description of the Transmission System

Hereafter, a description will be made of a transmission system for the present invention by using an example.

In this respect, the example shown below is intended to aid the understanding of the present invention by making it more concrete, and is not intended as a definition of the technical limits of the present invention.

A transmission system according to the present invention is applied to, for example, the VLAN system.

The transmission apparatus is a switching HUB for use in the VLAN system.

The switching HUB (transmission apparatus) has a plurality of ports, and these ports are divided into a plurality of groups (segments) each including one or more of the ports.

Communication nodes for a computer-data communication device or the like are connected to each of the ports in these groups, and communication nodes connected to the ports of one of the groups constitute one LAN.

As described above, the switching HUB is owned jointly by a plurality of VLANs, and performs the above process in the MAC layer to transmit data.

The transmission control apparatus is integrated within the same housing as the switching HUB (transmission apparatus), or is constructed within a separate housing from the switching HUB (transmission apparatus), and its transmission control functions are performed by software (program) running on a computer.

The determination means of the transmission control apparatus analyzes the input/output port of the switching HUB (transmission apparatus) and MAC frame (target data) to determine whether each of the MAC frames is a MAC frame (first target data) of unicast to be transmitted with a single communication node as the destination, or a MAC frame of multicast to be transmitted with a plurality (one or more) of communication nodes as the destination, or a MAC frame (second target data) of broadcast to be transmitted to all the communication nodes as the destinations.

When the MAC frame (target data) transmitted is the MAC frame (first target data) for unicast, if a communication node of the destination belongs to the same VLAN as the communication node at the transmission source, the first control means performs layer 2 switching. If the communication node of the destination belongs to other VLANs, the first control means transfers the data through a processor.

When the MAC frame (target data) transmitted is a MAC frame (second target data) for multicast or broadcast, the second control means controls the switching HUB (transmission apparatus) so that the MAC frame (second target data) is transmitted only to the communication nodes that belong to the same VLAN as the communication node at the transmission source.

That is, when the MAC frame (target data) transmitted is a MAC frame (second target data) of multicast or broadcast, the second control means controls the switching HUB (transmission apparatus) such that this MAC frame is confined within each VLAN to be transmitted.

Transmission Control Apparatus

Also, a transmission control apparatus according to the present invention is a transmission control apparatus for controlling transmission of target data subject to transmission between a plurality of nodes each having an address, the plurality of nodes being divided into a plurality of groups, each of the group including one or more nodes, the transmission control apparatus having: determination means for determining whether the target data transmitted by each of the nodes being first target data to be transmitted to any one destination of the plurality of nodes or second target data to be transmitted to any one or more destinations of the plurality of nodes; first control means for controlling so that the transmitted first target data being transferred to the node designated as the destination when the transmitted target data being determined as the first target data; and second control means for controlling so that the transmitted second target data being transferred to the node/nodes belonging to the same group as the node having transmitted the second target data within the nodes designated as the destination when the transmitted target data being determined as the second target data.

Preferably, an identifier is attached to each of the plurality of groups, each of the nodes attaches the identifier of the group to which each belonging to the target data to transmit the target data with the identifier, and the second control means controls so as to transfer the transmitted second target data to the node/nodes belonging to the group which indicated by the identifier attached to the second target data.

Preferably, the target data is transmitted in a format of a MAC (Media Access Control) frame defined in the IEEE802.3Q, a node to be included in each of the plurality of groups owns the transmission apparatus jointly to constitute each of a plurality of VLANs (Virtual Local Area Networks), and an identifier attached to each of the plurality of groups is a VLAN-ID (Identifier) of each of the plurality of VLANS, and is attached to the MAC frame as a tag.

Transmission Control Method

Also, a transmission control method according to the present invention is a transmission control method for controlling transmission of target data subject to transmission between a plurality of nodes each having an address, the plurality of nodes being divided into a plurality of groups, each of the group including one or more nodes, comprising the steps of: determining whether the target data transmitted by each of the nodes being first target data to be transmitted to any one destination of the plurality of nodes or second target data to be transmitted to any one or more destinations of the plurality of nodes; controlling so that the transmitted first target data being transferred to the node designated as the destination when the transmitted target data being determined as the first target data; and controlling so that the transmitted second target data being transferred to the node/nodes belonging to the same group as the node having transmitted the second target data within the nodes designated as the destination when the transmitted target data being determined as the second target data.

[Program]

Also, a transmission control method according to the present invention is a program for causing a computer to execute, in a transmission control apparatus for controlling, through the use of the computer, transmission of target data subject to transmission between a plurality of nodes each having an address, the plurality of nodes being divided into a plurality of groups, each of the group including one or more nodes, the steps of: determining whether the target data transmitted by each of the nodes being first target data to be transmitted to any one destination of the plurality of nodes or second target data to be transmitted to any one or more destinations of the plurality of nodes; controlling so that the transmitted first target data being transferred to the node designated as the destination when the transmitted target data being determined as the first target data; and controlling so that the transmitted second target data being transferred to the node/nodes belonging to the same group as the node having transmitted the second target data within the nodes designated as the destination when the transmitted target data being determined as the second target data.

BRIEF DESCRIPTION OF THE DRAWINGS

The above and other objects of the invention will be seen by reference to the description taken in connection with the accompanying drawings, in which:

FIG. 3 is a view showing the format of a MAC (Media Access Control) frame, which is defined in IEEE802.3 and is transmitted in the VLAN system shown in FIG. 1;

FIG. 6 is a chart for exemplifying information which VLAN information DB of the switch control program shown in FIG. stores;

FIG. 11 is a view for explaining the merits of the VLAN system, FIG. 11(A) shows a structure in which one control unit (CPU) controls a device (MAC) for processing a plurality of MAC layers; and FIG. 11(B) shows a structure in which one control unit (CPU) for processing the MAC layer controls a NIC (Network Interface Control) device;

DETAILED DESCRIPTION OF THE INVENTION

Hereafter, descriptions will be made of embodiments of the present invention.

The present invention is constructed such that ports for switching devices to be used in a LAN such as Ethernet (registered trademark of Xerox Corporation) are divided into groups (VLANs), and each of the switching devices is provided with a processor (switch control apparatus).

In such a structure, a VLAN-ID is inserted to data inputted to a port, whereby it becomes possible to control the port for outputting the data.

Further, in this structure, since processors (switch control apparatus) are provided to correspond with the switching device, it is also possible to cope with communication that extends over a plurality of VLANs, unnecessary multicast/broadcast is restrained, traffic is reduced and transmission efficiency is improved.

VLAN System

Figure 1:
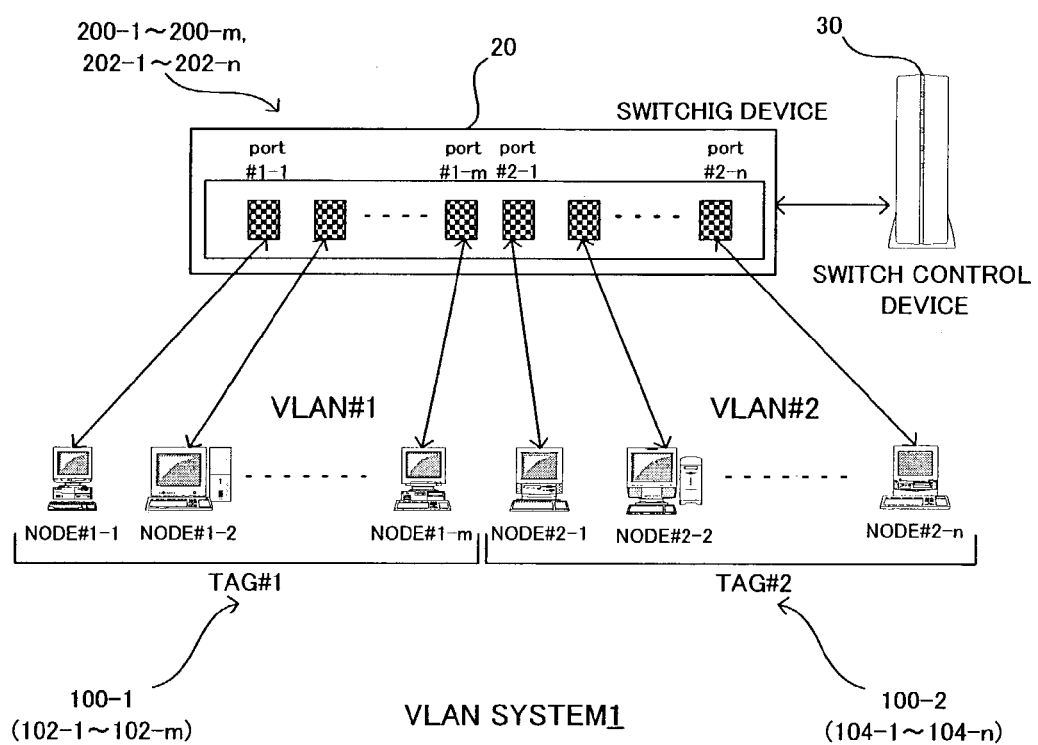
FIG. 1 is a view showing an example of structure of a VLAN (Virtual Local Air Network) system to which a transmission control method according to the present invention is applied.

FIG. 1 exemplifies a structure of a VLAN (Virtual Local Air Network) system 1 to which a transmission control method according to the present invention is applied;

As shown in FIG. 1, a VLA.N system 1 is composed of: a switching device 20 such as a switching HUB, a switch control device 30, and communication notes 102-1 to 102-m, 104-1 to 104-n for m+n (m,n>1) of computer-data communication devices and the like.

The communication nodes 102-1 to 102-*m* are connected to the first to the m-th ports (port #1-1 to #1-m) 200-1 to 200-*m* of the switching device 20 to constitute a first VLAN (VLAN #1) 100-1.

Also, the communication nodes 104-1 to 104-*n* are connected to the (m+1)-th to (m+n)-th ports (port #2-1 to #2-n) 202-1 to 202-*n* of the switching device 20 to constitute a second VLAN (VLAN #2) 100-2.

To the communication nodes 102-1 to 102-*m*, 104-1 to 104-*n*, MAC addresses unique to each of them are attached, and are used as transmission sources and destination addresses for the data.

To the VLAN 100-1, 100-2, TAG #1, #2 are given respectively as identifiers (VLAN-IDs).

The communication node 102 belonging to the VLAN 100-1 attaches TAG #1 to data (portion of Tag control bit of the MAC frame to be described later referring to FIG. 3) to be transmitted as a tag for transmitting.

Similarly, the communication node 104 belonging to the VLAN 100-2 attaches TAG #2 to data to be transmitted as a tag for transmitting.

In this respect, when indicating a plurality of components such as the communication nodes 102-1 to 102-*m* without identifying any of them, it may be simply abbreviated to a communication node 102 or the like.

Also, numbers of VLANs to be included in the VLAN system 1, ports, communication nodes and the like of the switching device 20 are not particularly limited, but hereafter, in order to make the description very clear and concrete, a case where these numbers are as shown in FIG. 1 will be defined as a concrete example.

Switching Device 20

Figure 2:
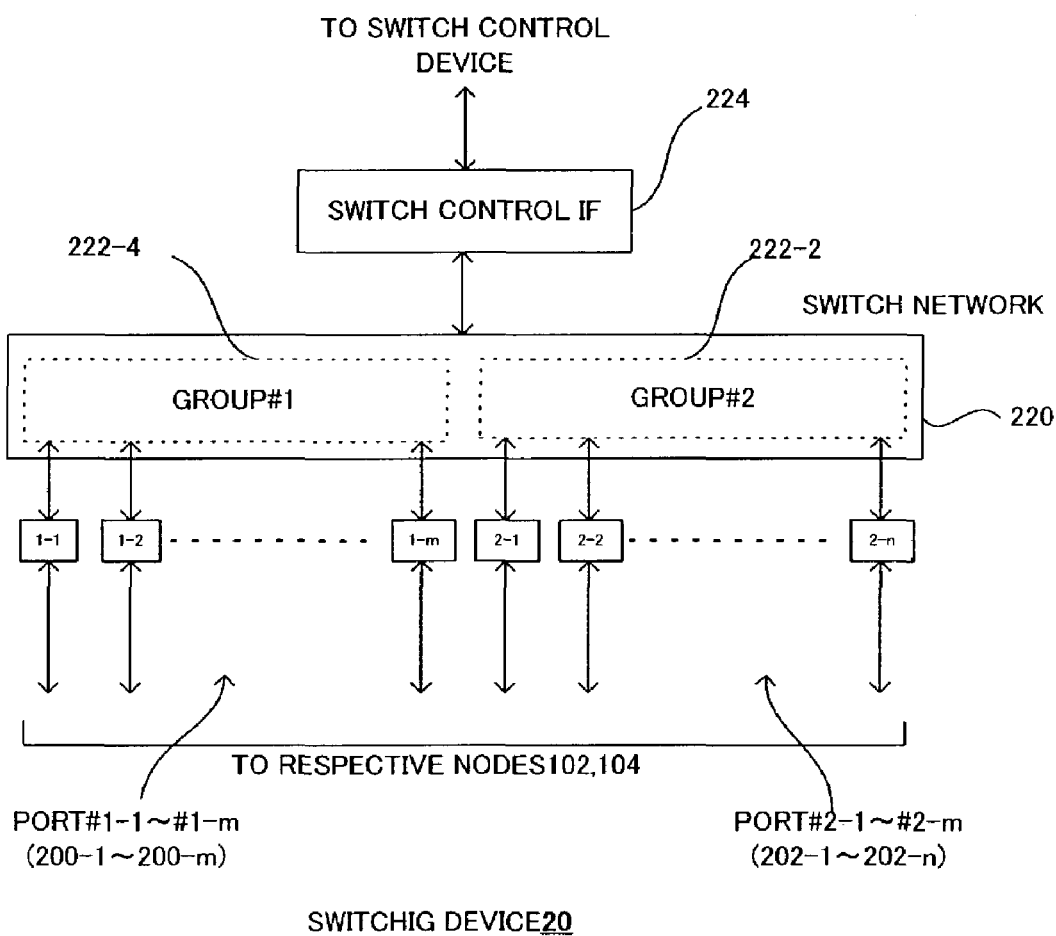
FIG. 2 is a view showing the structure of the switching device shown in FIG. 1.

FIG. 2 is a view showing the structure of the switching device 20 shown in FIG. 1.

FIG. 3 is a view showing a format of a MAC (Media Access Control) frame as defined in IEEE802.3 which is transmitted in the VLAN system 1 shown in FIG. 1.

As shown in FIG. 2, the switching device 20 is composed of: a switch network 220; ports 200-1 to 200-*m*, 202-1 to 202-*n*; and a switch control interface (switch control IF) 224.

The switching device 20 operates in accordance with control from the switch control device 30 (FIG. 1), and processes the MAC layer belonging to the second layer (data link layer) of the OSI reference model by means of these components.

In this respect, in the VLAN system 1, for communication between the switching device 20 and communication nodes to be connected thereto, the MAC frame shown in FIG. 3 is used, and by attachment of the TAG-ID within the switching device 20, the ports are divided into groups to be controlled.

Transmission Control

The switching device 20 also performs the following transmission control in accordance with control by the switch control device 30.

That is, between the communication nodes 102 belonging to the VLAN 100-1, and between the communication nodes 104 belonging to the VLAN 100-2, the switching device 20 transmits the MAC frame of unicast, multicast and broadcast in the form of being confined within each of the communication nodes 102 and 104.

Also, between the communication node 102 belonging to the VLAN 100-1 and the communication node 104 belonging to the VLAN 100-2, the switching device 20 transmits only the MAC frame of unicast through the switch control device 30.

That is, the switching device 20 transmits the MAC frame of broadcast/multicast only in the forms of being confined within each of the VLAN 100-1 and 100-2, and does not transmit between the communication node 102 belonging to the VLAN 100-1 and the communication node 104 belonging to the VLAN 100-2.

The ports 200-1 to 200-*m*, 202-1 to 202-*n* are as described already, divided into m pieces of first group (group#1; segment) 222-1 and n pieces of second group (group #2) 222-2 which correspond to the VLAN100-1 and 100-2 respectively.

The ports 200, 202 physically connect the switch network 220 to the communication nodes 102, 104 respectively, to transmit data between them.

Switch control IF 224 provides an interface function between the switch control device 30 and the switch network 220.

That is, the switch control IF 224 receives each of all the data (MAC frame; described later referring to FIG. 3) to be inputted from the communication node 102, 104, or a portion necessary for transmission control from the switch network 220 to output to the switching device 20.

The switch control IF 224 outputs all MAC frames to be inputted from each of the communication nodes 102, 104 through the port 200, 202, or the above mentioned portion necessary for the transmission control of the MAC frames to the switch control IF 224.

Also, in accordance with the control from the switch control device 30 through the switch control IF 224, the switch control IF 224 outputs the MAC frame to be inputted from each of the communication nodes 102, 104 through the ports 200, 202 to each of other communication nodes 102, 104 to each of the other communication nodes 102, 104, through other ports 200, 202, whereby the transmission control is realized.

In this respect, hereafter, unless otherwise specified, a case where all MAC frames are outputted from the switch network 220 through the switch control IF 224 to the switch control device 30 will be defined as a concrete example.

Switch Control Device 30

Figure 4:
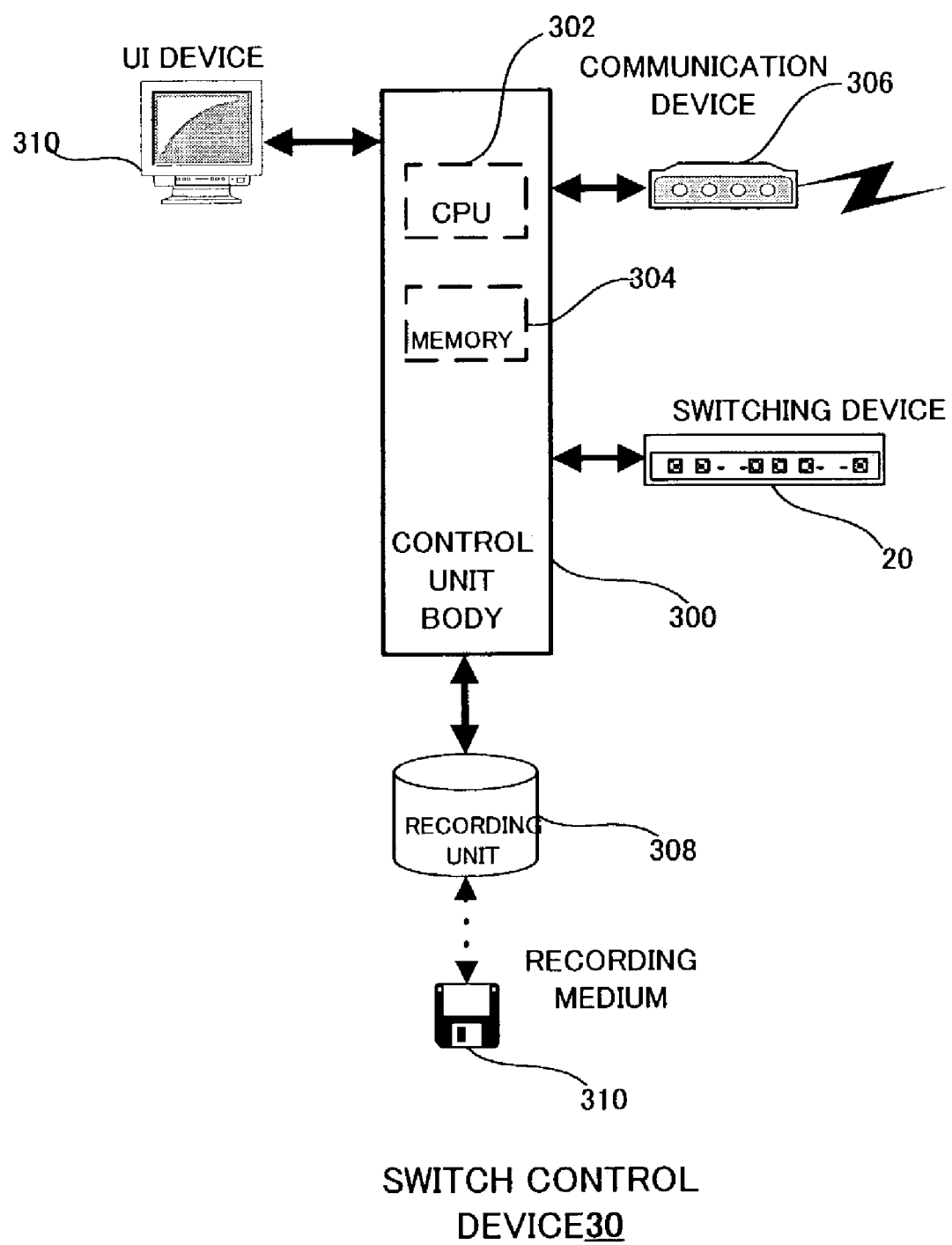
FIG. 4 is a view showing the hardware structure of the switch control device shown in FIG. 1.

FIG. 4 is a view showing a hardware structure of the switch control device 30 shown in FIG. 1.

As shown in FIG. 4, the switch control device 30 is composed of: a control unit body 300 including a CPU 302, a memory 304 and the like; a communication device 306 for performing communication with a network (not shown); a recording unit 308 such as a HDD/CD unit; and a user interface unit (UI unit) 312 including a keyboard/LCD display unit and the like.

In other words, the switch control device 30 includes the same components as those of a typical computer.

In this respect, of the components of the switch control device 30, what has directly nothing to do with transmission control to the switching device 20, such that the communication device 306 can be selectively removed from the switch control device 30.

Figure 5:
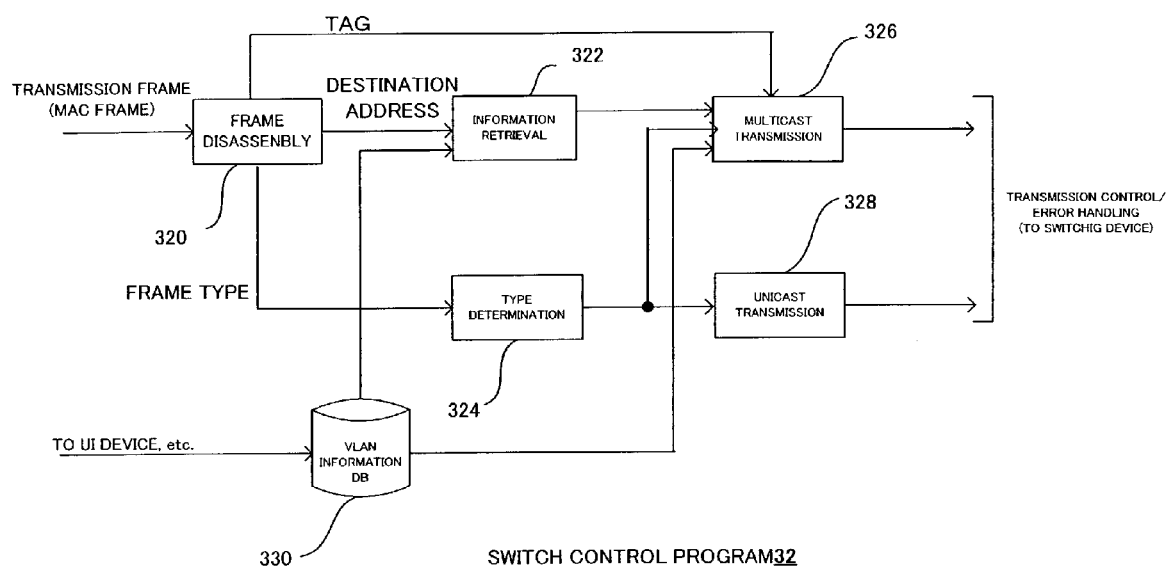
FIG. 5 is a view showing structure of a switch control program for realizing transmission control according to the present invention.

FIG. 5 is a view showing a structure of a switch control program 32 for realizing transmission control according to the present invention;

As shown in FIG. 5, the switch control program 32 is composed of: a frame disassembly unit 320; an information retrieval unit 322; a type determination unit 324 (determination means); a multicast transmission control unit 326 (second control means); a unicast transmission control unit 328 (first control means); and a VLAN information data base (VLAN information DB) 330.

The switch control program 32 is supplied to the switch control device 30 through, for example, a recording medium 310, and is loaded in the memory 304 to be carried out.

The switch control program 32 controls the switching device 20 by means of these components to perform the transmission control.

In the switch control program 32, a packet disassembly unit 320 disassembles each of the MAC frames (FIG. 3) to be inputted from the switching device 20.

Further, the frame disassembly unit 320 separates, from the disassembled MAC frame, the MAC address (destination address) indicating a communication node (either communication node 102 or 104) of the destination of the MAC frame, and a tag (TAG #1 or TAG #2) indicating to which VLAN (VLAN 100-1 or VLAN 100-2) the communication node (either communication node 102 or 104) of the transmission source belongs.

In this respect, in the case of the multicast, there can exist a plurality (one or more) of destination addresses.

Therefore, in this case, the frame disassembly unit 320 separates each of these destination addresses.

Also, the frame disassembly unit 320 is housed in the destination address portion of the disassembled MAC frame, and separates two upper bits of destination address of the MAC frame indicating whether the MAC frame is a MAC frame of unicast, or a MAC frame of multicast, or a MAC frame of broadcast.

The frame disassembly unit 320 outputs the destination address separated to the information retrieval unit 322 to output the two upper bits of the destination address of the MAC frame separated to the type determination unit 324.

Also, the frame disassembly unit 320 outputs the TAG separated to the multicast transmission control unit 326.

FIG. 6 is a chart exemplifying information that the VLAN information DB 330 of the switch control program 32 shown in FIG. 5 stores.

The VLAN information DB 330 stores information that has been set through the UI unit 312 or the like and is used for the transmission control described above.

That is, by bringing into correspondence with each of the VLAN-ID (TAG #1, #2) of the VLAN 100-1, 100-2, the VLAN information DB 330 stores MAC addresses of each of communication nodes 102 and 104 belonging to each of the VLAN 100-1 and 100-2, and any of the ports 200 and 202 (FIGS. 1 and 2) of the switching device 20 to which each of the communication nodes 102 and 104 is connected.

The VLAN information DB 330 provides the information retrieval unit 322 and the multicast transmission control unit 326 with the information stored.

The information retrieval unit 322 retrieves the VLAN information DB 330 to discover VLAN-ID (TAG #1 or TAG #2) corresponding to the destination address to be inputted from the frame disassembly unit 320 as well as a port (port 200 or port 202) to which a communication node (communication node 102 or communication node 104) of the destination is connected, and provides the multicast transmission control unit 326 and the unicast transmission control unit 328 with the retrieval result together with the destination address inputted from the frame disassembly unit 320.

In this respect, in the case of the multicast, there can exist a plurality of (one or more) destination addresses.

Therefore, in this case, the information retrieval unit 322 discovers the VLAN-ID corresponding to each of these destination addresses, and a port (port 200 or port 202) to which a communication node (communication node 102 or communication node 104) which each of these destination addresses indicates is connected, to output to the multicast transmission control unit 326 together with these destination addresses.

The type determination unit 324 determines whether the two upper bits of the destination address of the MAC frame to be inputted from the frame disassembly unit 320 are a MAC frame of unicast or a MAC frame of multicast or broadcast, to output the determination result to the multicast transmission control unit 326 and the unicast transmission control unit 328.

The multicast transmission control unit 326 operates only when the determination result of the MAC frame to be inputted from the type determination unit 324 indicates multicast or broadcast.

The multicast transmission control unit 326 checks the VLAN-ID in order to send data within the VLAN to which a port to which the data has been inputted belongs, and controls the switching device 20 so as to transmit this MAC frame only to the destination address corresponding to the same VLAN-ID as the TAG inputted from the frame disassembly unit 320.

Also, when the determination result of the MAC frame indicates broadcast, the multicast transmission control unit 326 retrieves the VLAN information DB330, and obtains, as the destination address, the MAC addresses of all communication nodes (communication node 102 or communication node 104) belonging to the VLAN (VLAN100-1 or VLAN100-2) which corresponds to the same VLAN-ID as the TAG inputted from the frame disassembly unit 320.

The multicast transmission control unit 326 controls the switching device 20 so as to transmit this MAC frame to all the destination addresses obtained as described above.

As described above, the multicast transmission control unit 326 realizes transmission of the MAC address of multicast and broadcast confined in either VLAN100-1 or 100-2.

The unicast transmission control unit 328 performs the processing only when the determination result of the MAC frame to be inputted from the type determination unit 324 indicates unicast, and controls the switching device 20 so as to transmit this MAC frame to either the communication node 102 or 104 indicated by the destination address.

Operation of Switch Control Program 32

Hereafter, the description will be made of the operation of the switch control program 32.

Figure 7:
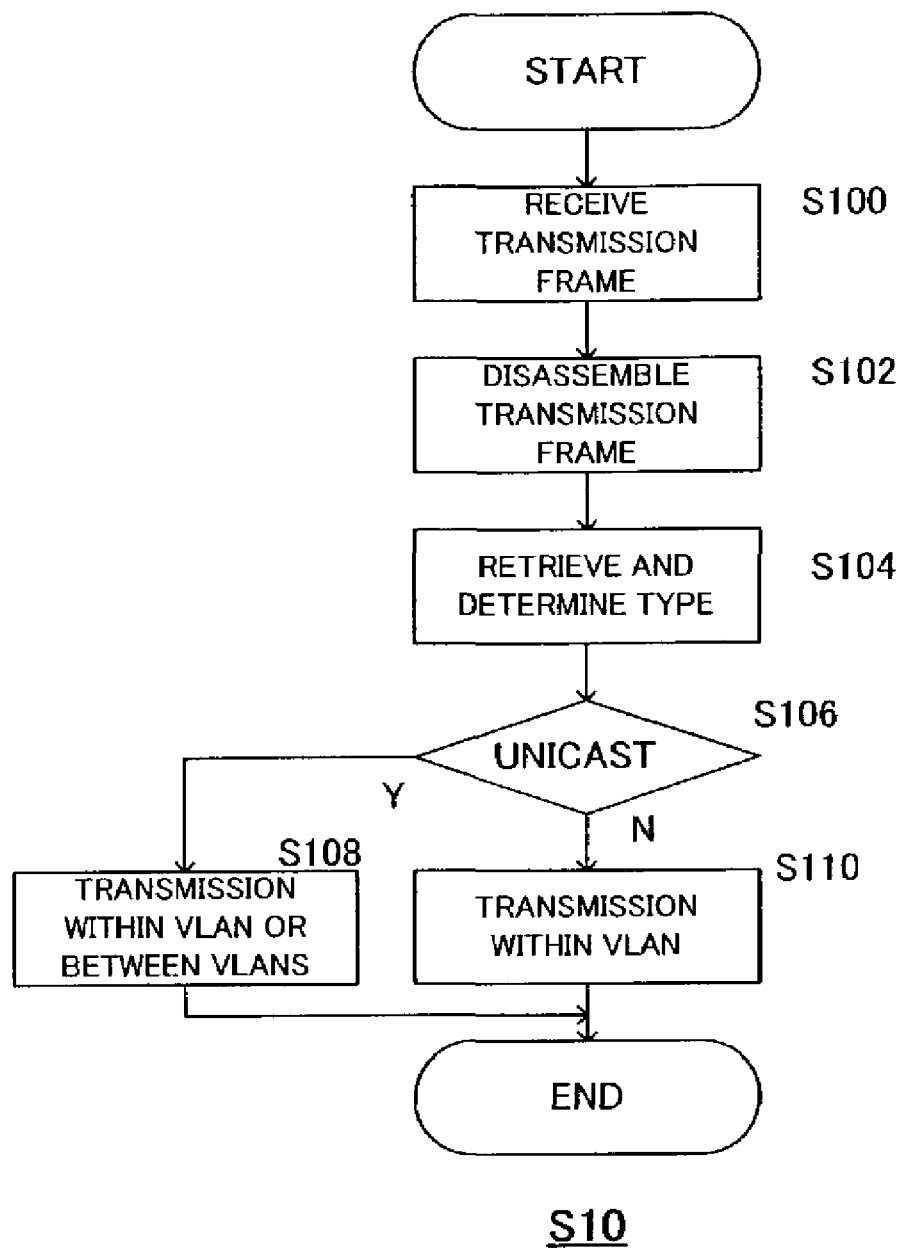
FIG. 7 is a flowchart showing an operation (S10) of the switch control program.

FIG. 7 is a flowchart showing the operation (S10) of the switch control program 32.

As shown in FIG. 7, in step 100 (S100), the frame disassembly unit 320 of the switch control program 32 receives a transmission frame (MAC frame; FIG. 3) from switch control IF224 of the switching device 20.

In step 102 (S102), the frame disassembly unit 320 disassembles the transmission frame (MAC frame) received to separate the destination address, the TAG and the two upper bits of the destination address of the MAC frame.

The frame disassembly unit 320 outputs the destination address separated to the information retrieval unit 322, outputs the two upper bits of the destination address of the MAC frame separated to the type determination unit 324, and outputs the TAG separated to the multicast transmission control unit 326.

In step 104 (S104), the information retrieval unit 322 retrieves the VLAN information DB330 to discover the VLAN-ID corresponding to the destination address to be inputted from the frame disassembly unit 320, as well as a port to which the communication node of the destination is connected, and provides the multicast transmission control unit 326 and the unicast transmission control unit 328 with the retrieval result together with the destination address.

Also, the type determination unit 324 checks an upper bit to be inputted from the frame disassembly unit 320 to determine whether the MAC frame is a MAC frame of unicast, a MAC frame of multicast, or a MAC frame of broadcast, and outputs the determination result to the multicast transmission control unit 326 and the unicast transmission control unit 328.

In step 106 (S106), the multicast transmission control unit 326 and the unicast transmission control unit 328 determine whether or not the determination result of the type determination unit 324 is unicast.

When the determination result is unicast, the unicast transmission control unit 328 proceeds to the processing in a step S108, and at other times (when the determination result is multicast or broadcast), the multicast transmission control unit 326 proceeds to the processing in step S110.

In step 108 (S108), when the communication node at the transmission source and the communication node of the destination belong to the same VLAN, the unicast transmission control unit 328 controls the switching device 20 so as to transmit the transmission frame (MAC frame) between the ports. At other times, the unicast transmission control unit 328 controls the switching device 20 so as to transmit the transmission frame (MAC frame) through the switch control device 30.

In step 110 (S110), the multicast transmission control unit 326 controls the switching device 20 so as to transmit a transmission frame (MAC frame) of multicast or broadcast only to the communication node that belongs to the same VLAN as the communication node at the transmission source.

Overall Operation of VLAN System 1

Hereafter, a description will be made of an overall operation of the VLAN system 1.

First, a description will be made of the overall operation of the VLAN system 1 when transmitting the transmission frame (MAC frame) of unicast within the same VLAN.

Figure 8:
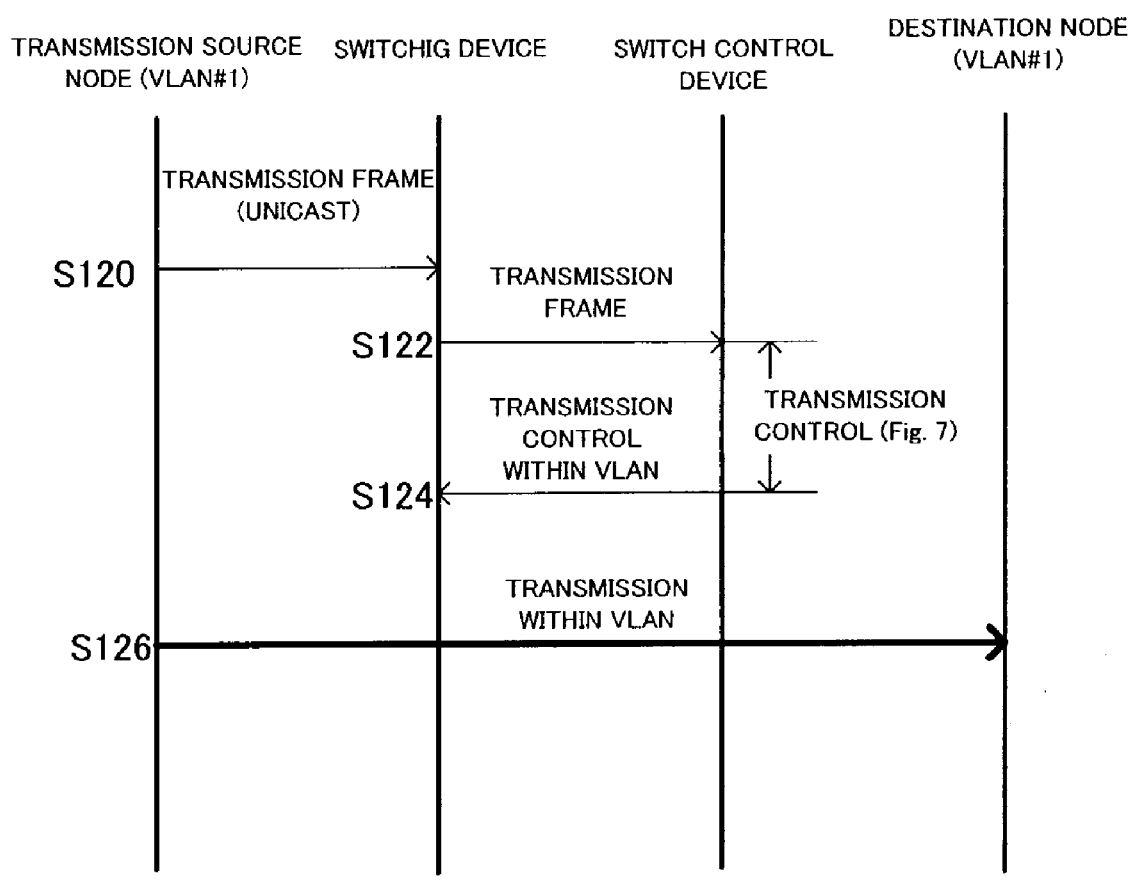
FIG. 8 is a view showing a communication sequence (S12) when transmitting a transmission frame of unicast from any of the communication nodes at a transmission source belonging to VLAN #1, to any (destination node) other communication nodes belonging to the same VLAN #1.

FIG. 8 is a view showing a communication sequence (S12) when transmitting a transmission frame of unicast from any of the communication nodes 102 at a transmission source belonging to VLAN 100-1 (VLAN #1) to any (destination node) of the other communication nodes 102 belonging to the same VLAN 100-1.

As shown in FIG. 8, the communication node 102 at the transmission source sends the transmission frame (MAC frame; FIG. 3) of unicast whose destination is the communication node 102 belonging to the same VLAN 100-1 to the switching device 20 (S120).

The switching device 20 outputs the transmission frame (MAC frame) received from the communication node 102 at the transmission source to the switch control device 30 (S122).

The switch control device 30 performs the transmission control shown in FIG. 7 (S124) to transmit the transmission frame (MAC frame) from the communication node 102 at the transmission source to the communication node 102, which is the destination (S126).

Next, a description will be made of the overall operation of the VLAN system 1 when transmitting the transmission frame (MAC frame) of unicast between different VLANs.

Figure 9:
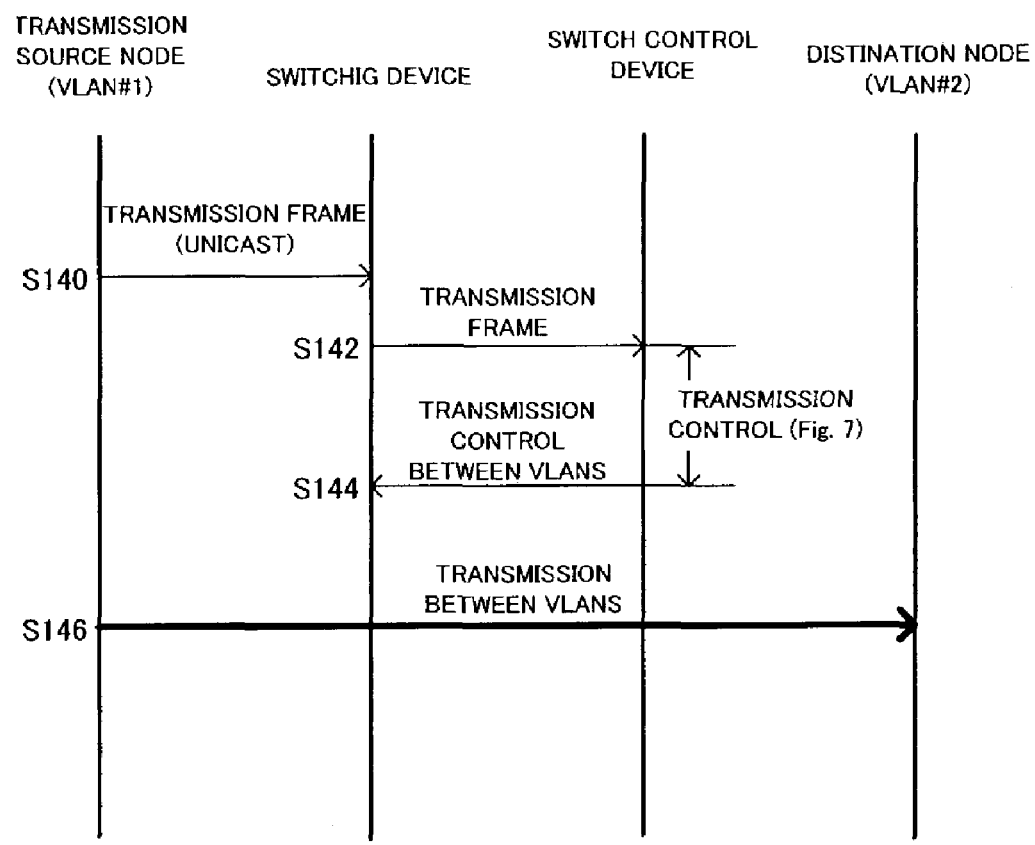
FIG. 9 is a view showing a communication sequence (Sl4) when transmitting a transmission frame of unicast from any of communication nodes 102 at a transmission source belonging to VLAN #1, to any (destination node) other communication nodes belonging to VLAN #2, which are different from VLAN #1.

FIG. 9 is a view which shows a communication sequence (S14) when transmitting a transmission frame of unicast from any of the communication nodes 102 at a transmission source belonging to VLAN100-1 (VLAN #1), to any (destination node) of other communication nodes 104 belonging to VLAN 100-2 (VLAN #2) different from VLAN 100-1.

As shown in FIG. 9, the communication node 102 at the transmission source sends the transmission frame (MAC frame; FIG. 3) of unicast whose destination is the communication node 104 belonging to VLAN 100-2 different from VLAN 100-1 to the switching device 20 (S140).

The switching device 20 outputs the transmission frame (MAC frame) received from the communication node 102 at the transmission source to the switch control device 30 (S142).

The switch control device 30 performs the transmission control shown in FIG. 7 (S144) to transmit the transmission frame (MAC frame) from the communication node 102 at the transmission source to the communication node 104, which is the destination (S146).

Next, a description will be made of the overall operation of the VLAN system 1 when transmitting the transmission frame (MAC frame) of unicast between different VLANs.

Figure 10:
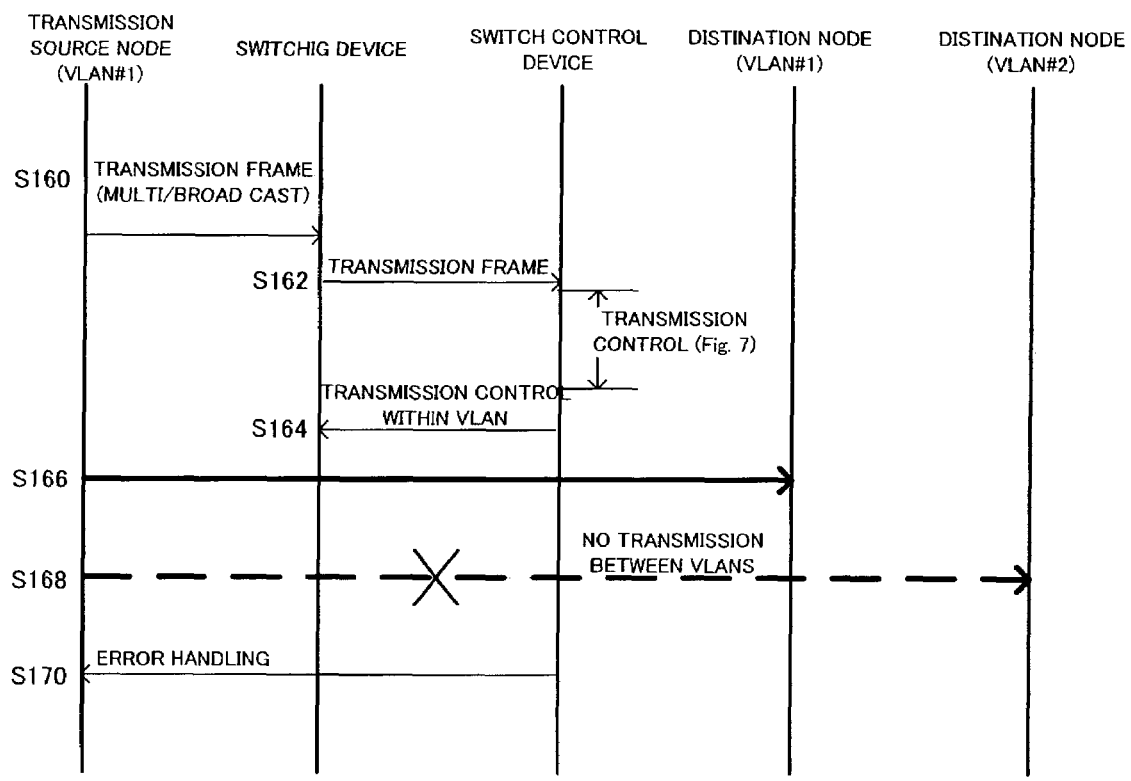
FIG. 10 is a view showing a communication sequence (S16) when transmitting a transmission frame of multicast or broadcast from any of communication nodes at a transmission source belonging to VLAN #1.

FIG. 10 is a view showing a communication sequence (S16) when transmitting a transmission frame of multicast or broadcast from any of the communication nodes 102 at a transmission source belonging to VLAN 100-1 (VLAN #1).

As shown in FIG. 10, the communication node 102 at the transmission source sends the transmission frame (MAC frame; FIG. 3) of multicast or broadcast to the switching device 20 (S160).

The switching device 20 outputs the transmission frame (MAC frame) received from the communication node 102 at the transmission source to the switch control device 30 (S162).

The switch control device 30 performs the transmission control shown in FIG. 7 (S164) to transmit the transmission frame (MAC frame) from the communication node 102 at the transmission source, to another communication node 102 or 104 in multicast or broadcast (S166).

On the other hand, the switch control device 30 does not transmit the transmission frame (MAC frame) from the communication node 102 at the transmission source to a communication node 104 belonging to another VLAN100-1 (S168).

Further, as the need arises, the multicast transmission control unit 326 of the switch control device 30 performs error handling such as issuing a message to the effect that the transmission frame (MAC frame) of multicast or broadcast has not reached the communication node 104 belonging to the VLAN100-2 (S170).

FIG. 11 is a view for explaining merits of the VLAN system 1. FIG. 11(A) shows a structure in which one control unit (CPU) controls a device (MAC) for processing a plurality of MAC layers; and FIG. 11(B) shows a structure in which one control unit (CPU) for processing the MAC layer controls a NIC (Network Interface Control) device.

When an attempt is made to control a plurality of MACs by one control unit to cause each of the plurality of MACs to perform transmission control of the VLAN as shown in, for example, FIG. 11(A), the need to transmit the multicast and broadcast between a plurality of VLANS is circumvented, but since it is necessary to prepare a plurality of MACs, the scale of the hardware becomes large and the cost is increased.

On the other hand, when one control unit (CPU) for processing the MAC layer makes an attempt to control one physical layer (PHY) and one NIC (Network Interface Control) device for performing the transmission control of two VLANs as shown in FIG. 11(B), it is not possible to prevent the transmission of the multicast and broadcast to be performed between a plurality of VLANs.

In contrast, since the structure of the VLAN system 1 is capable of controlling a plurality of VLANs through the use of one control unit for processing the MAC layer, the scale of the hardware is small and the cost is low, and moreover, it is possible to prevent the transmission of the multicast and broadcast to be performed between a plurality of VIANs.

Variation

Figure 12:
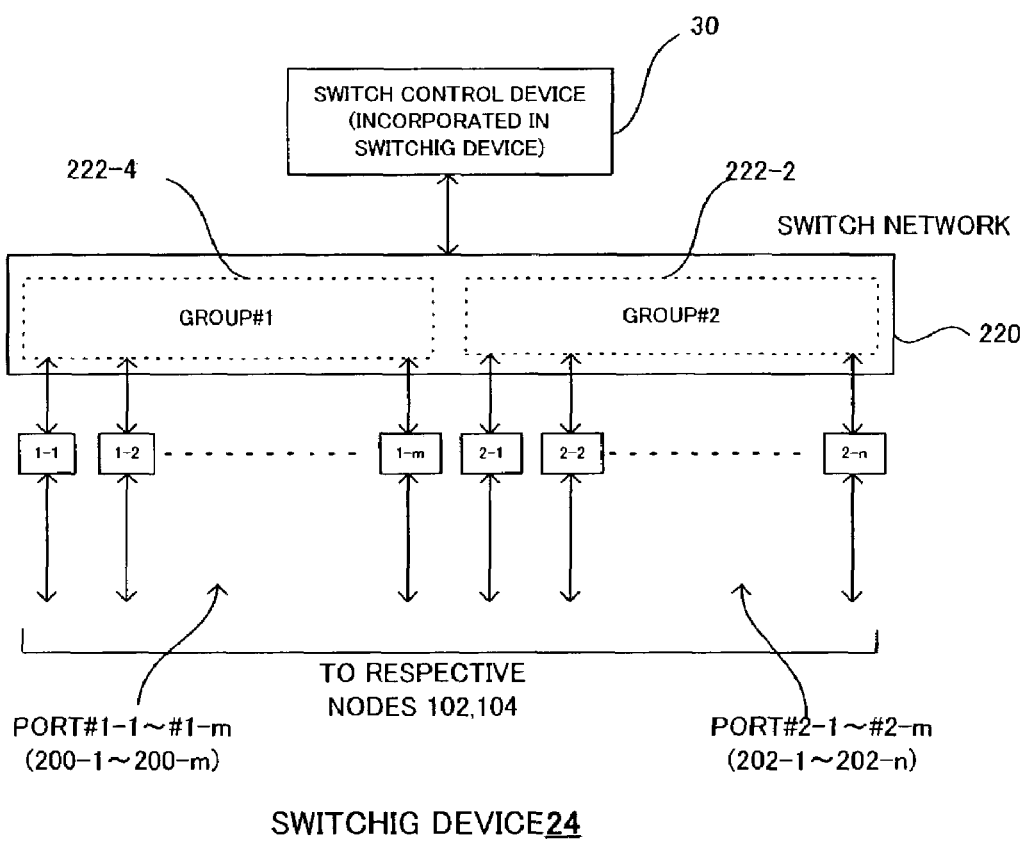
FIG. 12 is a view showing a variation of the first switching device shown in FIG. 2, and the structure of the second switching device.

FIG. 12 is a view showing a variation of the first switching device 20 shown in FIG. 2, and a structure of the second switching device 24.

As shown in FIG. 1, in the VLAN system 1, the switching device 20 and the switch control device 30 have been constructed as separate devices, but these may be integrated within the same housing.

Such a structure as shown in the switching device 24 is suitable for a particularly small scale VLAN system, and the cost of the VLAN system can be further reduced as compared with a case in which the switching device 20 and the switch control device 30 are constructed as separate devices.

Figure 13:
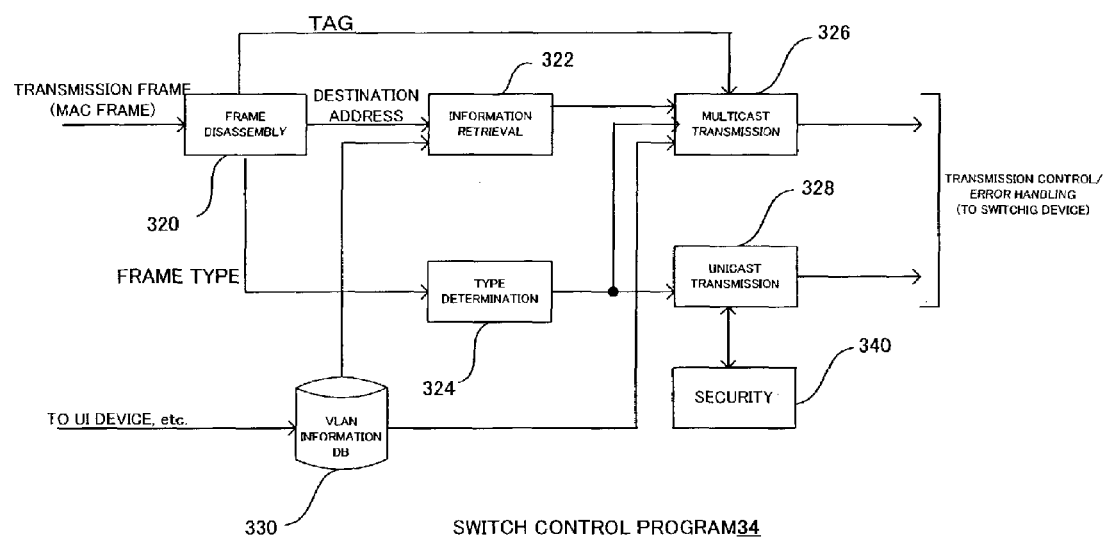
FIG. 13 is a view showing a variation of the first switch control program shown in FIG. 5, and the structure of the second switch control program.

FIG. 13 is a view showing a variation of the first switch control program 32 shown in FIG. 5, and a structure of the second switch control program 34.

As shown in FIG. 13, the switch control program 34 is constructed such that a security unit 340 for providing a filtering function, a firewall function and the like of the MAC frame is added to the unicast transmission control unit 328.

As described above, the security unit 340 is added to the unicast transmission control unit 328, whereby the security of the VLAN system 1 can be improved.

As described above, according to a transmission system and a method thereof of the present invention, it is possible to restrain traffic of the LAN and to reduce the load.

Also, according to a transmission system and a method thereof of the present invention, it is possible to increase the transmission speed and to improve the transmission efficiency by restraining the occurrence of the multicast/broadcast in the VLAN.

INDUSTRIAL APPLICABILITY

A transmission system and a method thereof according to the present invention can be utilized for data transmission in local area networks and the like.

What is claimed is:

1. A transmission system, having:

transmission apparatus for transmitting target data subject to transmission between a plurality of nodes each having an address; and a transmission control apparatus for controlling transmission of target data between the nodes, wherein the plurality of nodes are divided into a plurality of groups, each group including one or more of the nodes, the transmission control apparatus having:

determination means for determining whether the target data transmitted by each of the nodes is first target data to be transmitted to any one destination of the plurality of nodes or second target data to be transmitted to any one or more destinations of the plurality of nodes;

first control means for controlling so that the transmitted first target data is transferred to the node designated as the destination when the transmitted target data is determined as the first target data; and second control means for controlling so that the transmitted second target data is transferred to the node/nodes belonging to the same group as the node having transmitted the second target data within the nodes designated as the destination when the transmitted target data is determined as the second target data;

wherein the transmission apparatus includes a plurality of ports divided in a plurality of groups to form VLANs, configured so that each of such grouped ports corresponds to a respective one of the grouped nodes, and wherein the transmission control apparatus controls the transmission apparatus so that output target data is transmitted to a destination node belonging to the same group as a transmission source node via a port belonging to the group, without sending the output target data to a destination node of any other groups;

wherein the transmission control apparatus is programmably operated by a switch control program comprising a frame disassembly unit, an information retrieval unit, a type determination unit, a unicast transmission control unit for the first control means, a multicast transmission control unit for the second control means, and a VLAN information database, wherein the transmission system comprises a memory and the switch control program is resident in said memory and operatively arranged for operation of the transmission control apparatus, comprising:

the frame disassembly unit disassembling target data comprising a media access control (MAC) frame to separate therefrom a MAC address indicating a communication node of a destination of the MAC frame, and a tag indicating to which VLAN the communication node of transmitted target data belongs;

wherein in the case of a multicast target data transmission, a multiplicity of destination addresses is present, and wherein the frame disassembly unit operates to (1) separate destination addresses from target data transmissions, comprising separation of two upper bits of destination address of the MAC frame, to indicate whether the MAC frame is of unicast, multicast or broadcast character, (2) output to the information retrieval unit a separated destination address, (3) output to the type determination unit the separated two upper bits of destination address of the MAC frame, and (4) output the tag to the multicast transmission control unit.

2. The transmission system as set forth in claim 1, wherein the transmission apparatus is a switching apparatus, the switching apparatus including a plurality of ports to which each of the plurality of nodes is connected respectively, and a switch for transferring the target data between the plurality of ports under control of transmission of the target data.

3. The transmission system set forth in claim 1, wherein, the transmission apparatus and the transmission control apparatus are integrated.

4. The transmission system set forth in claim 1, wherein the tag comprises an identifier that is attached to each of the plurality of groups, wherein each of the nodes attaches the identifier of the group to which each belongs to the target data to transmit the target data with the identifier, and the second control means controls so as to transfer the transmitted second target data to the node/nodes belonging to the group which is indicated by the identifier attached to the second target data.

5. The transmission system set forth in claim 4, wherein the target data is transmitted in a format of a MAC frame defined in the IEEE802.3Q.

6. A transmission control apparatus for controlling transmission of target data subject to transmission between a plurality of nodes each having an address, the plurality of nodes being divided into a plurality of groups, each of the groups including one or more nodes, the transmission control apparatus having: determination means for determining whether the target data transmitted by each of the nodes is first target data to be transmitted to any one destination of the plurality of nodes or second target data to be transmitted to any one or more destinations of the plurality of nodes; first control means for controlling so that the transmitted first target data is transferred to the node designated as the destination when the transmitted target data is determined as the first target data; and second control means for controlling so that the transmitted second target data is transferred to the node/nodes belonging to the same group as the node having transmitted the second target data within the nodes designated as the destination when the transmitted target data is determined as the second target data; wherein the transmission control apparatus is adapted for use with a transmission apparatus including a plurality of ports divided in a plurality of groups to form VLANs, configured so that each of such grouped ports corresponds to a respective one of the grouped nodes, and wherein the transmission control apparatus controls the transmission apparatus so that output target data is transmitted to a destination node belonging to the same group as a transmission source node via a port belonging to the group, without sending the output target data to a destination node of any other groups;

wherein the transmission control apparatus is programmably operated by a switch control program comprising a frame disassembly unit, an information retrieval unit, a type determination unit, a unicast transmission control unit for the first control means, a multicast transmission control unit for the second control means, and a VLAN information database, wherein the transmission system comprises a memory and the switch control program is resident in said memory and operatively arranged for operation of the transmission control apparatus, comprising:

the frame disassembly unit disassembling target data comprising a media access control (MAC) frame to separate therefrom a MAC address indicating a communication node of a destination of the MAC frame, and a tag indicating to which VLAN the communication node of transmitted target data belongs;

wherein in the case of a multicast target data transmission, a multiplicity of destination addresses is present, and wherein the frame disassembly unit operates to (1) separate destination addresses from target data transmissions, comprising separation of two upper bits of destination address of the MAC frame, to indicate whether the MAC frame is of unicast, multicast or broadcast character, (2) output to the information retrieval unit a separated destination address, (3) output to the type determination unit the separated two upper bits of destination address of the MAC frame, and (4) output the tag to the multicast transmission control unit.

7. The transmission control apparatus set forth in claim 6, wherein the tag comprises an identifier that is attached to each of the plurality of groups, wherein each of the nodes attaches the identifier of the group to which each belongs to the target data to transmit the target data with the identifier, and the second control means controls so as to transfer the transmitted second target data to the node/nodes belonging to the group which is indicated by the identifier attached to the second target data.

8. The transmission control apparatus set forth in claim 7, wherein the target data is transmitted in a format of a MAC frame defined in the IEEE802.3Q.

9. A transmission control method for controlling transmission of target data subject to transmission between a plurality of nodes each having an address, the plurality of nodes being divided into a plurality of groups, each of the group including one or more nodes, comprising the steps of:

determining whether the target data transmitted by each of the nodes being first target data to be transmitted to any one destination of the plurality of nodes or second target data to be transmitted to any one or more destinations of the plurality of nodes;

controlling so that the transmitted first target data being transferred to the node designated as the destination when the transmitted target data being determined as the first target data; and controlling so that the transmitted second target data being transferred to the node/nodes belonging to the same group as the node having transmitted the second target data within the nodes designated as the destination when the transmitted target data being determined as the second target data;

wherein said transmission of target data is effected by a transmission apparatus including a plurality of ports divided in a plurality of groups to form VLANs, configured so that each of such grouped ports corresponds to a respective one of the grouped nodes, and wherein the transmission apparatus is controlled so that output target data is transmitted to a destination node belonging to the same group as a transmission source node via a port belonging to the group, without sending the output target data to a destination node of any other groups;

wherein the transmission control apparatus is programmably operated by a switch control program comprising a frame disassembly unit, an information retrieval unit, a type determination unit, a unicast transmission control unit for the first control means, a multicast transmission control unit for the second control means, and a VLAN information database, wherein the transmission system comprises a memory and the switch control program is resident in said memory and operatively arranged for operation of the transmission control apparatus, comprising:

the frame disassembly unit disassembling target data comprising a media access control (MAC) frame to separate therefrom a MAC address indicating a communication node of a destination of the MAC frame, and a tag indicating to which VLAN the communication node of transmitted target data belongs;

wherein in the case of a multicast target data transmission, a multiplicity of destination addresses is present, and wherein the frame disassembly unit operates to (1) separate destination addresses from target data transmissions, comprising separation of two upper bits of destination address of the MAC frame, to indicate whether the MAC frame is of unicast, multicast or broadcast character, (2) output to the information retrieval unit a separated destination address, (3) output to the type determination unit the separated two upper bits of destination address of the MAC frame, and (4) output the tag to the multicast transmission control unit.

10. A computer readable medium encoded with a computer program comprising computer executable instructions for causing a computer to execute, in a transmission control apparatus for controlling, through the use of the computer, transmission from a transmission apparatus of target data subject to transmission between a plurality of nodes each having an address, the plurality of nodes being divided into a plurality of groups, each of the group including one or more nodes, the steps of:

determining whether the target data transmitted by each of the nodes being first target data to be transmitted to any one destination of the plurality of nodes or second target data to be transmitted to any one or more destinations of the plurality of nodes;

controlling so that the transmitted first target data being transferred to the node designated as the destination when the transmitted target data being determined as the first target data; and controlling so that the transmitted second target data being transferred to the node/nodes belonging to the same group as the node having transmitted the second target data within the nodes designated as the destination when the transmitted target data being determined as the second target data, wherein said transmission apparatus includes a plurality of ports divided in a plurality of groups to form VLANs, configured so that each of such grouped ports corresponds to a respective one of the grouped nodes, and wherein the transmission apparatus is controlled so that output target data is transmitted to a destination node belonging to the same group as a transmission source node via a port belonging to the group, without sending the output target data to a destination node of any other groups;

wherein the transmission control apparatus is programmably operated by a switch control program comprising a frame disassembly unit, an information retrieval unit, a type determination unit, a unicast transmission control unit for the first control means, a multicast transmission control unit for the second control means, and a VLAN information database, wherein the transmission system comprises a memory and the switch control program is resident in said memory and operatively arranged for operation of the transmission control apparatus, comprising:

the frame disassembly unit disassembling target data comprising a media access control (MAC) frame to separate therefrom a MAC address indicating a communication node of a destination of the MAC frame, and a tag indicating to which VLAN the communication node of transmitted target data belongs;

wherein in the case of a multicast target data transmission, a multiplicity of destination addresses is present, and wherein the frame disassembly unit operates to (1) separate destination addresses from target data transmissions, comprising separation of two upper bits of destination address of the MAC frame, to indicate whether the MAC frame is of unicast, multicast or broadcast character, (2) output to the information retrieval unit a separated destination address, (3) output to the type determination unit the separated two upper bits of destination address of the MAC frame, and (4) output the tag to the multicast transmission control unit.

\* \* \* \* \*

UNITED STATES PATENT AND TRADEMARK OFFICE
CERTIFICATE OF CORRECTION

PATENT NO. : 7,406,076 B2
APPLICATION NO. : 10/370456
DATED : July 29, 2008
INVENTOR(S) : Norlyasu Katoh It is certified that error appears in the above-identified patent and that said Letters Patent is hereby corrected as shown below:

Column 4, line 65: "in FIG. stores" should be -- in FIG. 5 stores --.

Column 5, line 51: "VLA.N" should be -- VLAN --.

Column 5, line 54: "(m,n>1)" should be -- (m,n≥1) --.

Signed and Sealed this

Second Day of December, 2008

JON W. DUDAS
*Director of the United States Patent and Trademark Office*